United States Patent
Kopko

(10) Patent No.: US 6,994,156 B2
(45) Date of Patent: ***Feb. 7, 2006

(54) AIR-CONDITIONING SYSTEM WITH THERMAL STORAGE

(75) Inventor: William L. Kopko, Springfield, VA (US)

(73) Assignee: CoolSmart LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/126,232

(22) Filed: Apr. 18, 2002

(65) Prior Publication Data

US 2002/0179298 A1 Dec. 5, 2002

Related U.S. Application Data

(60) Provisional application No. 60/285,512, filed on Apr. 20, 2001.

(51) Int. Cl.
*F25B 29/00* (2006.01)

(52) U.S. Cl. .................. 165/201; 165/45; 165/268; 165/287; 62/235; 60/641.2

(58) Field of Classification Search ............... 165/201, 165/267, 268, 287, 45, 10; 60/641.2; 62/235
See application file for complete search history.

(56) References Cited

U.S. PATENT DOCUMENTS

| | | | | |
|---|---|---|---|---|
| 3,274,769 A | * | 9/1966 | Reynolds | 165/45 X |
| 3,521,699 A | * | 7/1970 | Van Huisen | 165/45 X |
| 3,786,858 A | * | 1/1974 | Potter et al. | 165/45 X |
| 3,791,443 A | * | 2/1974 | Burt et al. | 165/45 |
| 3,807,491 A | * | 4/1974 | Van Hulsen | 165/45 |
| 3,851,495 A | * | 12/1974 | Lahoud et al. | 165/45 X |
| 3,931,851 A | * | 1/1976 | Harris et al. | 165/45 X |
| 3,935,102 A | * | 1/1976 | Swearingen | 165/45 X |
| 3,997,112 A | * | 12/1976 | St. Clair | 165/45 X |
| 4,306,613 A | * | 12/1981 | Christopher | 165/287 X |
| 4,467,619 A | * | 8/1984 | Kovach | 62/235 |
| 5,383,337 A | * | 1/1995 | Baker | 165/45 X |
| 5,477,703 A | * | 12/1995 | Hanchar et al. | 165/45 X |
| 5,507,149 A | * | 4/1996 | Dash et al. | 165/45 X |
| 5,730,208 A | * | 3/1998 | Barban | 165/45 |
| 5,816,314 A | * | 10/1998 | Wiggs et al. | 165/45 |
| 5,937,934 A | * | 8/1999 | Hildebrand | 165/45 |
| 6,212,896 B1 | * | 4/2001 | Genung | 165/45 X |
| 6,227,000 B1 | * | 5/2001 | Irei et al. | 165/45 X |

(Continued)

FOREIGN PATENT DOCUMENTS

| | | | | |
|---|---|---|---|---|
| CH | 634 395 A5 | * | 1/1983 | 165/45 |

(Continued)

*Primary Examiner*—Ljiljana Ciric
(74) *Attorney, Agent, or Firm*—Novak Druce DeLuca & Quigg

(57) ABSTRACT

An air-conditioning system with thermal storage system for storing cooling capacity. The storage system comprises a quantity of fill material that preferably comprises water or similar liquid that is located in a cavity in the ground. The fill material may also include a bed of gravel with the pool of liquid filling the void spaces in the gravel. Sidewalls of the cavity are preferably supported primarily by the mechanical properties of the earth and the fill material. The lower boundary of the cavity is impermeable liner. A cover that blocks solar radiation and preferably with thermal insulation covers the top of the fill material. A chiller and a pump supply cooled liquid during night or other times of reduced electrical costs and liquid from the storage flows through a liquid-to-air heat exchanger during peak demand periods.

20 Claims, 3 Drawing Sheets

U.S. PATENT DOCUMENTS 6,412,550 B1 * 7/2002 McLaughlin ............... 165/45 X
6,450,247 B1 * 9/2002 Raff ............................ 165/45

FOREIGN PATENT DOCUMENTS

| | | | | |
|---|---|---|---|---|
| DE | 31 51 759 A1 | * | 7/1983 | ................... 165/45 |
| DE | 32 34 168 A1 | * | 3/1984 | ................... 165/45 |
| DE | 34 03 746 A1 | * | 8/1985 | ................... 165/45 |
| JP | 57-129335 | * | 8/1982 | ................... 165/45 |
| JP | 60-263055 | * | 12/1985 | ................... 165/45 |
| JP | 62-5027 | * | 1/1987 | ................... 165/45 |

* cited by examiner

AIR-CONDITIONING SYSTEM WITH THERMAL STORAGE

CROSS-REFERENCE TO RELATED APPLICATIONS

Applicant claims benefit of now abandoned provision application No. 60/285,512 filed on Apr. 20, 2001.

BACKGROUND

1. Field of the Invention

The invention in the field of thermal-storage devices that are suitable for use in air-conditioning systems.

2. Description of Prior Art

Thermal storage for space cooling and heating has a long history. Passive systems for buildings using massive masonry walls have been used for millennia in dry climates to provide a more-even interior temperature despite large swings in ambient temperatures.

Active thermal storage has been used for solar heating systems. Two types of thermal storage are common in these systems. The first type is storage use using insulated tanks of water. Water has the advantage of having high specific heat and the ability to store a large amount of heat in small volume, which reduces storage size. Unfortunately, while water itself is inexpensive, the insulated storage tanks necessary for holding the water and maintaining its temperature are quite expensive, typically a $1 per gallon or more. A secondary problem is water mixes very easily in a storage tank, which makes it difficult to achieve thermal stratification. Stratification is desirable for maximizing thermal storage capacity.

A second type of storage circulates air through a pebble bed. This type of storage takes more space than water storage, but it does not require a storage tank. The stone necessary for a pebble bed has a significant cost and the space requirements mean that this type of storage can take a large portion of a basement or other part of building. Because of these limitations, this type of storage is normally used for systems where air is the fluid circulating through the solar collectors since it eliminates the need for water-to-air heat exchangers.

More recently much work has gone into thermal storage for cooling systems. Thermal storage is used to allow the use of low-cost, off-peak electricity to run cooling systems at night to provide cooling necessary during the day.

Two types of storage are common for this application. First is cold-water storage, which simply stores chilled water in an insulated storage tank. In addition to the problems discussed above, the size requirements of the tank can be quite large because of the limited temperature differential available between the freezing point of water and the temperature required for useful cooling and dehumidification of the space (typically ~20° F.).

A second option for thermal storage for cooling is ice. Ice storage has the advantage of using the heat of fusion for water, which allows for a high storage density. Unfortunately making ice requires low evaporating temperatures from the refrigeration systems to reach the freezing point of water and to overcome the thermal resistance of ice that forms on heat exchanger surfaces. These problems reduce the efficiency and increase the cost for ice storage.

Phase-change systems have also been developed using various kinds of salts or other materials that freeze at appropriate temperatures for heating or cooling purposes. Unfortunately, these materials are usually quite expensive and frequently have problems very slow freezing rates, which create additional problems beyond those found with ice storage. Toxicity of materials can also be a concern in some cases.

Gravel-liquid mixtures have seen same use in thermal applications in the prior art. Harrison (U.S. Pat. No. 4,010,731) describes a system for storing high-temperature thermal energy from a solar collector using a buried, insulated tank containing a mixture of stones and water. The system does not contain any means for storing cooling capacity and teaches that a much different design that uses ice is required for storing cooling capacity.

Hanchar (U.S. Pat. No. 5,477,703) is an example of a system that uses gravel and water in an underground enclosure to transfer thermal energy between a ground-source heat pump and the ground. This arrangement does not allow direct use of water from the enclosure for directly cooling a building, and instead proposes rejecting heat from the heat pump to the enclosure during the cooling season.

Ippolito (U.S. Pat. No. 4,392,531) describes a similar arrangement that uses wells that contain a mixture of water and gravel for providing thermal input to a heat pump. Ippolito teaches the use of a separate, conventional tank for transient storage of thermal energy that is then used for space heating and cooling.

SUMMARY

In accordance with the present invention an air-conditioning system is provided with thermal storage that comprises a fill material in a cavity in the ground that Is cooled by a cooler and cooled liquid is circulated to a cooling load at a later time.

OBJECTS AND ADVANTAGES

The objectives of the present invention include:
1) low cost,
2) minimum space requirements, especially within a building,
3) simple to assemble and install,
4) reliable operation,
5) achieves thermal stratification to maximize storage capacity, and
6) use of readily available, inexpensive, non-toxic materials,

DESCRIPTION

A Preferred Embodiment

Figure 1:
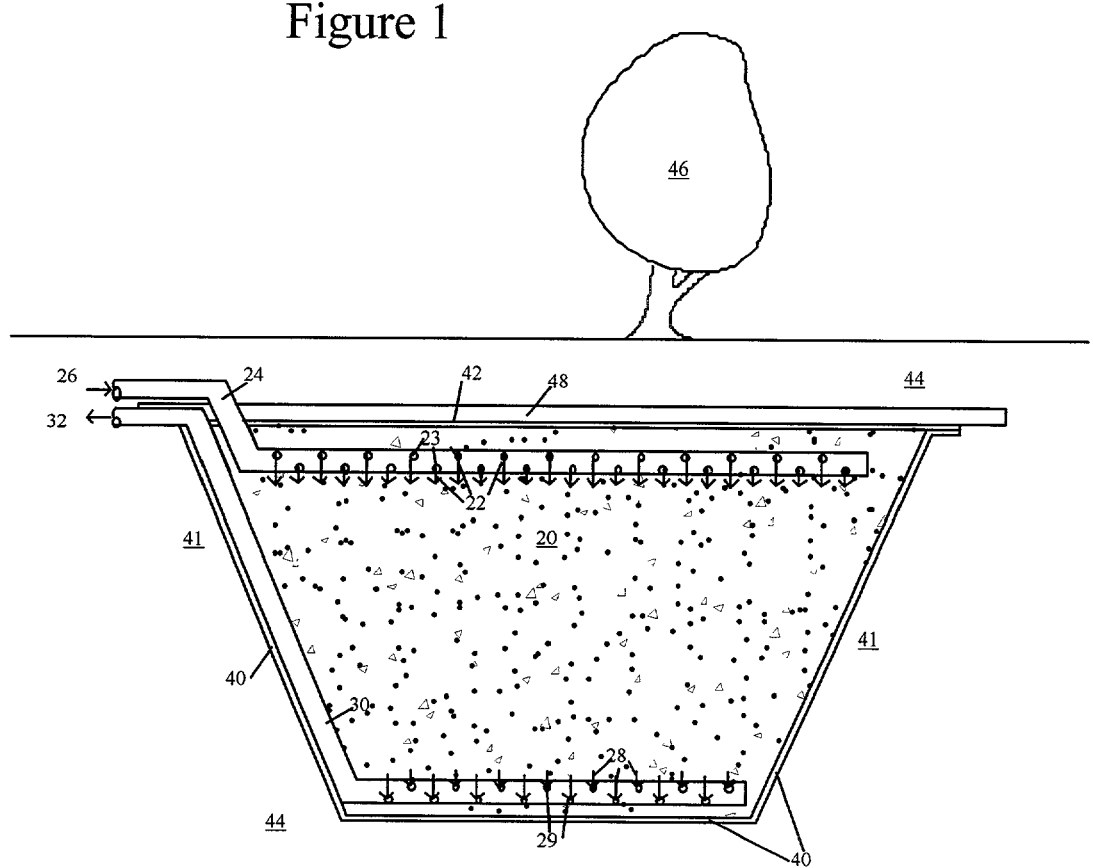
FIG. 1 shows a preferred embodiment of the invention that uses water in a bed of gravel for thermal storage.

FIG. 1 is a preferred embodiment of the invention. A pipe 24 provides a flow path for warm liquid 26. The liquid is preferably water or a dilute aqueous solution. As shown warm liquid 22 exits the pipe 24 through holes 23 and flows into a bed of permeable material 20, which acts as a fill material. A pool of liquid preferably fills the voids in the bed of permeable material 20. Cool liquid 28 exits the bed of porous material 20 through holes 29 in pipe 30 that provides a flow path for cool liquid 32.

A bottom liner 40 ensures that liquid stays in the bed of porous material. A top liner 42 prevents surface or ground water from entering the bed. The liner material is preferably a tough, impermeable, plastic material such as those used for liners for ponds or landfills.

The liner preferably prevents leakage of liquid and provides little or no structural support. Impermeable clay or similar material can also be used as a liner instead of a plastic. A thin layer of concrete cement, soil cement, or similar material is also a possibility. Wire or metal reinforcement of the liner is also a possibility.

Care should be taken to prevent damage to plastic liners, especially the bottom liner. The ground under the liner should be smoothed and sharp rocks should be removed to reduce risk of damage to the liner. A layer of clay may be added to further protect the liner. Clay with a low permeability to water can also help to contain any minor leakage from the liner. A layer of protective material, such as rounded pea-sized gravel, should be placed immediately above the liner to prevent damage from above. These precautions are generally similar to those for liners used in landfills and ponds as found in the prior art. Other precautions may be necessary depending on the recommendations of the liner manufacturer.

A layer of thermal insulation 48 at the top of the bed prevents undesirable heat transfer with the environment. Additional insulation may be provided at the sides of the cavity, or insulation may be eliminated depending on the economics and design characteristics of the site. The thermal insulation is preferably polystyrene foam, foamed glass, or similar material that is compatible with burial in the earth. The bed of porous material is preferably buried in earth 44 and may be covered with vegetation 46 to provide shade and reduce the heating effect of sunlight.

Sidewalls 41 of the cavity are preferably primarily supported by a combination of the material inside the cavity and the mechanical properties of the earthen walls. This feature of the present invention contrasts with the conventional chilled-water storage tanks that use heavy steel, concrete, etc. for structural support of the walls. For large cavities, the sides of the cavity in the earth holding the bed are preferably at a slope that is less than the angle of repose for the earth to eliminate the need for special re-enforcement of the earthen sides during construction. Once constructed the bed of porous material can provide sufficient force to support vertical walls, if required. FIG. 1 shows a cross-sectional view, it should be understood that the storage bed would have typically a trough, inverted-pyramid, or similar shape when viewed in three dimensions.

The bed of permeable material is preferably gravel, crushed stone, fieldstones, coarse sand, slag, or similar material that is allows liquid to flow through it. The permeable material preferably has particles with a sufficiently large surface area in comparison to their volume to ensure good heat transfer between the liquid and the bed material. The material should be clean of dirt or dust that may clog piping, it should be compatible with water, and it should not add corrosive or dangerous materials to the liquid. Material selection may vary depending on local availability and prices.

The void portion of the bed material is preferably filled with liquid. For gravel or similar material, the typical void fraction is about 0.20 to 0.60. Higher void fractions have the advantage of minimizing the mass of bed material required and increasing the thermal storage capacity of the material through the greater portion of water, but the geometry of the particles limits the void fraction that is normally available.

While not preferred, liquid can trickle through the bed of material with much of the void space filled with air or other gas. This option would normally only be used in cases where the liquid comprises an antifreeze solution or other expensive material.

With the flow directions as shown in FIG. 1, incoming liquid warms the bed material, displaces cool liquid in the bed, and allows cool liquid to leave the storage system. This flow configuration would be used to store thermal energy for later use for heating or it may be used to provide cooling to a building during the daytime. Reversing the direction of flow has the opposite effect; liquid cools the bed material, displaces warm liquid from the bed, and allows warm liquid to leave the system. This second flow configuration would be used to recharge the thermal storage for later cooling purposes or to provide heat for immediate use for space heating or other applications. The velocity of the liquid entering the bed should be low so as to help to maintain thermal stratification of liquid in the bed.

The pipes would typically be of polyethylene, polyvinyl chloride, or similar material to minimize corrosion. While the figure shows a single warm and a single cool liquid connection, multiple pipes may be used to ensure good distribution of liquid through the bed of permeable material.

For a system used to store cooling capacity the typical operating temperatures are between about 35 and 70° F. The lower temperature is limited by the freezing point of the liquid, which is about that of water. For a conventional air conditioning application, a chiller would supply chilled water to the thermal storage at about 45° F. and return water from a cooling coil would be about 65° F.

For storage of heating capacity the high temperature materials of construction limit the high temperature, typically to less than about 120 to 140° F. If higher-temperature materials are used then the ultimate limit is around the boiling point of water.

Figure 2A:
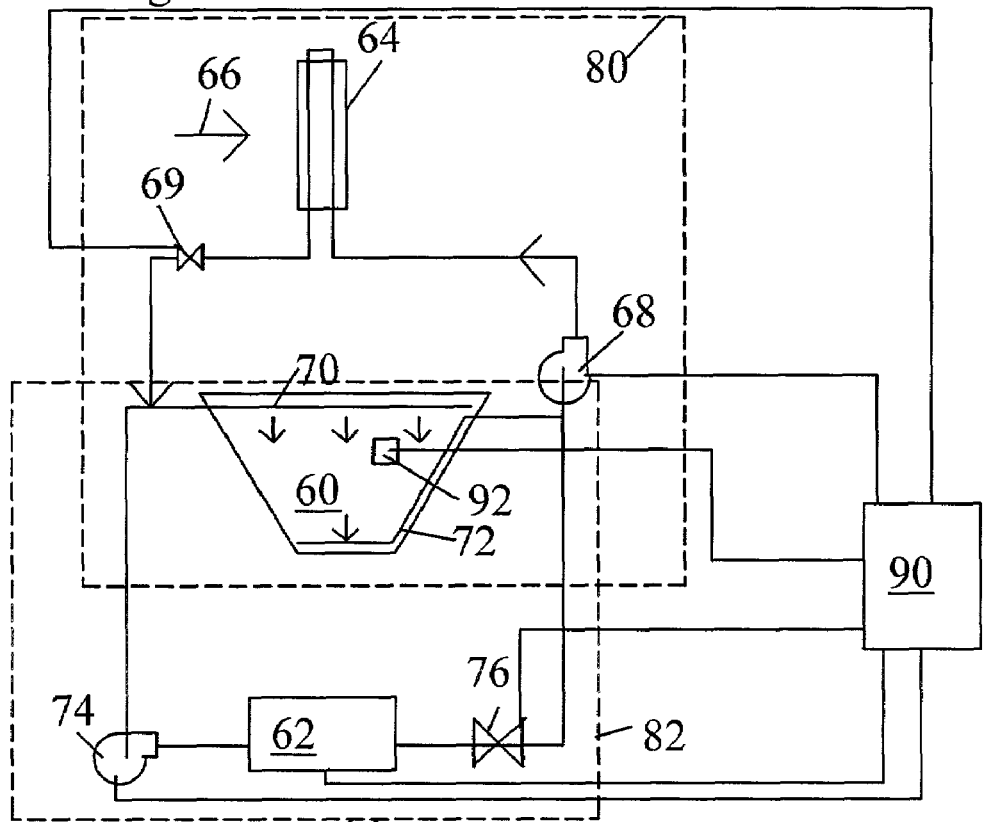
FIGS. 2A and 2B show an embodiment that is an integrated cooling system that is suitable for cooling buildings.
Figure 2B:
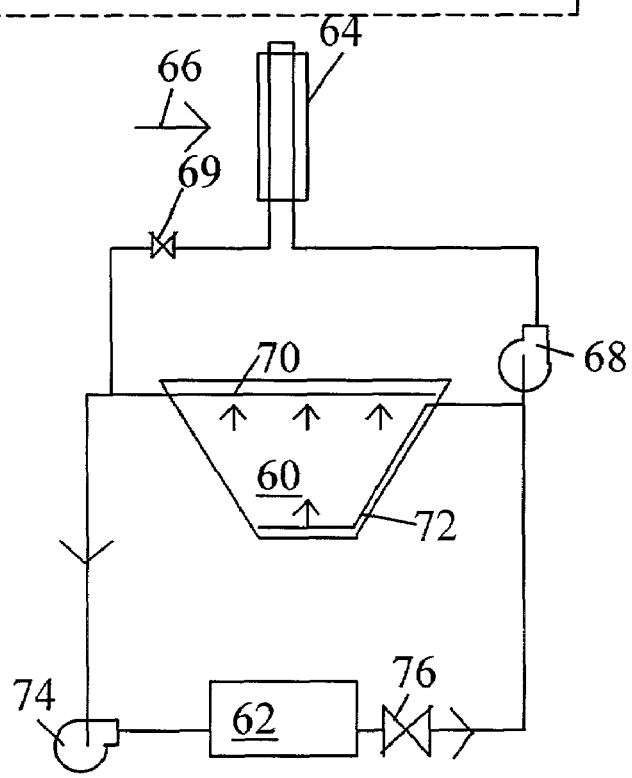

Integrated Cooling System—FIGS. 2A and 2B

FIG. 2A shows an integrated cooling system with thermal storage that is shown in space-cooling mode. A storage bed 60 receives warm water from warm-water pipe 70 that is located near the top of the bed. Cool water exits through cool-water pipe 72 which is near the bottom of the bed. Coil pump 68 circulates water from cool-water pipe 72 through a coil 64, which cools an air stream 66 and warms the water. A valve 69 is preferably located downstream of the coil 64. An alternative configuration is to insert a liquid-to-liquid heat exchanger between the coil 64 and the cool water from the storage bed so that the coil may be located at a significant elevation above the surface of liquid in the storage bed. Warm water returns from the coil to the bed by way of warm-water pipe 70 to complete a coil-water loop 80.

A cooler-water loop 82 shares the storage bed with the coil-water loop 80. A suction-end of a cooler water pump 74 is connected to the warm water pipe 70. A discharge end of the cooler pump 74 is connected through a cooler 62 to a valve 76. The valve 76 is normally closed when the pump 74 is off to prevent flow of water through the cooler. The cooler is a heat exchanger for cooling water and is normally part of an electric vapor-compression chiller. Alternatively an absorption water chiller, cooling tower, or evaporative cooler may be used instead of an electric vapor-compression chiller. The outlet of the cooler 62 is connected to the cool water pipe 72.

The physical location of the pumps depends on the pump design and the constraints of the site. A typical design is to use a submersible pump that is located inside the fill material below the liquid level. Another approach is to locate the pumps outside the fill material in a basement or other level below that of the liquid level. Self-priming pumps are another option, and may be located above the liquid level.

While FIG. 2A shows a single warm-water pipe for either intake and discharge of liquid to the fill material, separate pipes may be used. Likewise separate piping intake and discharge of cool water may be used. Baffles, multiple pipes ore other means for distributing liquid at low velocity may be included at the discharge points to maximize stratification.

FIG. 2B shows flow for recharging the storage bed. The cooler pump 74 draws warm water from the storage bed 60 through warm-water pipe 70 and pumps it through the valve 76 and cooler 62. The cooler lowers the temperature of the water, which then circulates through cool-water pipe 72 to storage bed 60. The coil pump 68 is normally off and coil valve 69 is normally closed during this recharge mode to prevent bypass of liquid around the storage bed.

A controller 90 is preferably included to control the operation of the system. The controller would include a time clock or is in communication with an electric utility so as to determine when low electric prices are available. The controller operates the system to recharge the thermal storage during this period and then discharges the thermal storage during periods of peak load. A temperature sensor 92 is preferably included to monitor storage temperature near the top of the liquid to sense the storage capacity. The controller is optional and manual operation of the system is possible.

While these figures show operation related to cooling a building or other load, similar arrangement is possible for heating. The main difference for heating is that the direction of flow through the storage bed should be reversed during charging and discharging of the thermal storage.

Simultaneous recharge and space cooling is possible. In this case, the cooler and cooler pump are operating at the same time that the coil pump is running. Assuming that the cooler pump has larger capacity, a portion of the water exiting the cooler will go to the coil and the remainder will enter the storage bed through the cool-water pipe. If the coil pump has the larger capacity, then a portion of the water exiting the coil will enter the storage bed through the warm-water pipe. Varying pump speed or adjusting valve positions can control the amounts of water flowing through the storage bed, the coil, and the cooler.

Numerous other configurations are possible that use many of the basic principles of the present invention: For example the storage bed can be placed under a building or at the surface of the earth instead of underground. If soil and insulation are omitted, then some form of radiant barrier is necessary to reduce solar heat gain. This can be achieved by simply leaving a layer of gravel near at the exposed surface of the bed above the level of the warm-water piping. A tarp or vegetation can also act as a sunshade.

Pressure control features may be included as is found in the prior art to ensure proper operation of the pumps while allowing the water at the top of the storage to be near atmospheric pressure. For example see ASHRAE, *Design Guide for Cool Thermal Storage* for a description features and configurations to maintain proper pressures.

For improved dehumidification at higher liquid temperatures, a desiccant system or other dedicated dehumidification system can be used. One alternative for dehumidification is to store a concentrated desiccant liquid, such as calcium chloride, that is regenerated at night using waste heat from the condenser of a chiller. See U.S. Pat. No. 6,185,943 and co-pending applications Ser. Nos. 09/549,329 and 09/772,306 for descriptions of air-conditioning systems that incorporate desiccant storage and make use of cooling at higher temperatures.

Alternative Configurations

Numerous other configurations are possible that use many of the basic principles of the present invention. For example the storage bed can be place under a building or at the surface of the earth instead of underground. If soil and insulation are omitted, then some form of radiant barrier is necessary to reduce solar heat gain. This can be achieved by simply leaving a layer of gravel near at the exposed surface of the bed above the level of the warm-water piping. A tarp or vegetation can also act as a sunshade.

Figure 3:
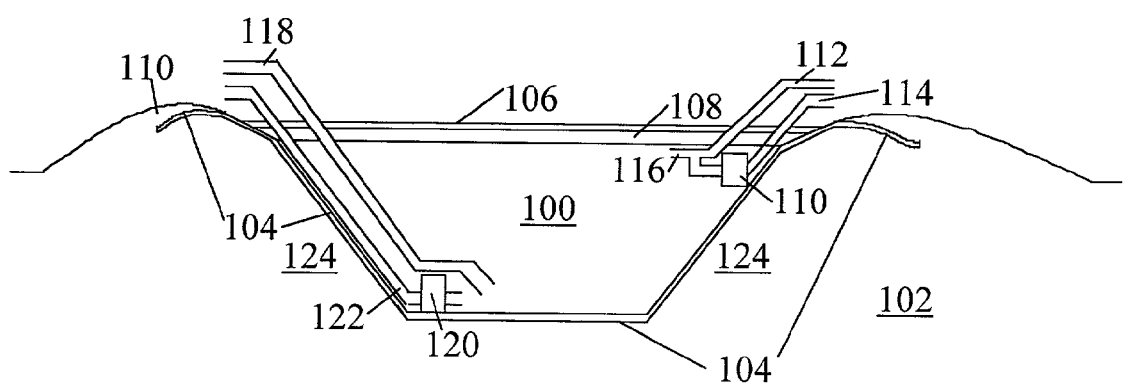
FIG. 3 shows a preferred embodiment that uses a pool of water for thermal storage.

FIG. 3—Pool Embodiment

Another alternative is to eliminate the gravel or other porous material and use a simple pool of water for fill material as is shown in FIG. 3. A pool of liquid 100 fills a cavity in the earth 102. This liquid is preferably fresh water, but it can be seawater or other readily available liquid. A liner 104 at the bottom of the pool of liquid prevents excessive leakage of liquid. Insulation 108, which preferably comprises polystyrene foam, polystyrene foam encased in polyethylene, foamed glass, or similar material floats on the pool of liquid 100. The insulation 108 can be in the form of blocks or slabs or even beads. A cover 106 is preferably on top of the insulation 108. The cover may be of plastic, wood, metal or other material. It is preferably opaque with a top surface that is reflects solar radiation to reduce the surface temperature and prevent damage of the insulation from ultraviolet light.

A cooler-water pump 110 draws water from near the top of the pool 100 through a warm-water pipe 116 and supplies it to a warm-water pipe 114. The cooler-water pump would normally operated when the pool is being cooled with a chiller, as was discussed for FIGS. 2A and 2B, and cooled water returns to the pool through a cool-water pipe 118.

A coil pump 120 draws water from near the bottom of the pool 100 and discharges it through a cool-water pipe 122. The cool-water normally goes to a heat exchanger for a cooling load and returns through a warm-water pipe 112.

While not preferred, it is possible to eliminate the thermal insulation 108. The cover 106 would have to include floats or other means of support. The cover should be designed to minimize stirring action of wind or waves. Since the cover blocks solar radiation, it is possible to create a stratified layer of liquid near the top of the pool, which provides a thermal resistance to heat flow from the surface. The warm water pipe 116 would preferably be located below this stratified layer.

This stratified layer can act as a thermal valve to allow convective heat transfer from the bottom of the pool to the surface when surface temperatures fall below that of the bottom. This configuration provides a passive means of cooling the pool of water and is suitable for large, deep pools (preferably >~20 feet deep) used for seasonal storage of cooling energy.

Even in the absence of any insulation or stratified surface layer, the pool would function adequately well as a thermal storage device for periods of a day or longer since losses to the environment are relatively minor. For example, a heat addition rate of 150 Btu/hr/ft2 of surface area corresponds to temperature change of only about 0.25° F. per hour for a 10-foot deep pool. Even modest amounts of insulation would greatly reduce the potential heat addition, so thermal losses should not significantly affect the basic performance of the system.

The slope of sidewalls 124 of the pool should be less than the angle of repose for the soil so that no reinforcement is required using primarily earthen walls. As shown in this embodiment, an earth berm 110, which preferably comprises earth removed from the ground to produce the cavity, rings the pool of liquid 100. The berm reduces excavation costs for a given pool depth and raises the height of the pool, which can help to maintain proper pressure to pumps and other components that may be located near the surface of the ground.

The berm also helps to prevent excessive amounts of rainwater or other surface water from flowing into the pool. Surface water can create problems with sediment accumulation in the pool, biological contamination of the pool, or flushing of cooled water to the environment, so this feature is significant.

Principle of Operation

Table 1 summarizes a comparison between wet gravel and water with a conventional storage tank. This analysis shows that gravel at a delivered price of $10 per ton has roughly one tenth of the cost of a storage tank for water at price of $1.00 per gallon. An important advantage of wet gravel over water is that it provides structural support, which greatly reduces the cost for a suitable container. (Specific gravity and specific heat values used in this table are from *Marks' Standard Handbook for Mechanical Engineers*, 1978.)

TABLE 1

Cost and Performance Comparison

| | dry specific gravity | wet specific gravity | Estimated void fraction | heat capacity per unit volume (water = 1) | heat capacity per dry ton (Btu/F/ton) | cost in $/ (Btu/F) |
|---|---|---|---|---|---|---|
| gravel, low density | 1.4 | 1.89 | 0.49 | 0.77 | 1100 | $0.009 |
| gravel, high density | 1.7 | 2.16 | 0.46 | 0.8 | 941 | $0.011 |
| water | 1 | 1 | 1 | 1 | 2000 | $0.120 |

Thermal performance of wet gravel is also quite good with almost 80% of the storage density of water on a volume basis, which is over twice that of dry grave or stone. This high storage density combined with the ability to bury the storage outside or under buildings greatly reduces the cost associated with use of valuable interior space for thermal storage. Gravel also has the advantage of reducing mixing of water and thereby enhancing thermal stratification in the storage bed.

The cost for the pool embodiment should be even more favorable, but the pool arrangement reduces the ability to make multiple use of the land. The grave bed configuration provides a large amount of structural support, which would allow placement of parking areas, parks, buildings, water-retention ponds, etc. over the storage system.

With the pool configuration, there are fewer options. One possibility is to place a second pool of water on top of the cover. This configuration would require an anchoring system to prevent the insulation from floating to the top of the top pool. This second pool could be used for decoration or for flood control or other applications. Another option is to create a floating walkway or other structure on top of the pool.

In addition to the thermal storage provided by the storage bed, the surrounding ground provide some additional storage capability. This feature further enhances the performance of the system, although the effect is relatively small. In general, the preferred configuration is to use single large storage system for a given installation to minimize installation cost and reduce thermal losses to the environment.

Control of operation of the system should be similar to that in the prior art of thermal storage for air-conditioning applications. Cooling capacity is stored at night or weekends or other periods of reduced electrical prices and reduced cooling load. This stored capacity provides cooling during the daytime or other periods of relatively high cooling load and high electric prices. The cooling capacity is preferably used for space conditioning of buildings, inlet cooling for gas turbines or other industrial applications. For the pool embodiment, very large quantities of inexpensive thermal storage are possible, which means that seasonal storage is an option. Seasonal storage may include storing cooling capacity in the winter for cooling in the summer.

An exception to the preference for using a single large storage system is the case of a cooling system with separate sensible end latent cooling, such as is described in U.S. Pat. No. 6,185,943. For this type of cooling system, two storage systems may be desirable. A warmer storage system would operate with a minimum temperature of about 60° F. and maximum temperature of about 70° F. and would be used for sensible cooling. The latent cooling system required much colder water, with a minimum temperature of about 45° F. and a maximum temperature of about 55 to 60° F. The two storage systems can be located in a single cavity in the ground with the warmer system above the colder. A layer of insulation or stratified water can separate the two systems to minimize undesirable heat transfer. A single chiller may sequentially cool the two storage systems.

Summary of Advantages:
1) Low cost,
2) Minimizes space requirements, especially within a building,
3) Simple to assemble and install,
4) Reliable operation,
5) Achieves thermal stratification to maximize storage capacity, and
6) Uses readily available, inexpensive, non-toxic materials.

What is claimed is:

1. A thermal storage device for storing cooled liquid comprising:
   a. a cavity in the earth's surface with contents that comprise a pool of aqueous liquid;
   b. a liner that is substantially impermeable to liquid and which covers the bottom of said cavity so as to contain said pool of aqueous liquid;
   c. sidewalls of said cavity that comprise an earthen material with any structural reinforcement to said sidewalls capable of being supplied essentially by said contents of said liner;
   d. a protective layer over the top of said pool of aqueous liquid that prevents transmission of solar radiation into said pool of aqueous liquid and reduces heat transfer between said pool and the environment; and
   e. a fluid circuit that comprises
      i. a cooler that cools liquid,
      ii. a cooling load that comprises a heat exchanger between said liquid and a second fluid to be cooled, and iii. means for moving liquid that moves liquid reversibly in a vertical direction through said pool such that when storage of cooling capacity is required, said means for moving liquid withdraws warm liquid near the top of said pool, moves the liquid through said cooler, which cools the liquid to form cooled liquid, and supplies the cooled liquid near the bottom of said pool which causes cooled liquid to displace warm liquid upward through the pool and when retrieval of stored coo ing capacity is required, the means for moving liquid withdraws cooled liquid near the bcttom of said pool, moves it through said cooling load, which warms the liquid, and supplies warm liquid near the top of said pool, which causes warm liquid to displace cooled liquid downward through the pool and thereby provided storage and retrieval of useful cooling to the cooling load.

2. The thermal storage device of claim 1 further comprising a bed of porous fill material that is contained within said liner in said cavity and wherein said pool of aqueous liquid fills voids within said porous fill material.

3. The thermal storage device of claim 2 wherein said porous fill material Is selected from the group consisting of gravel, crushed stone, fieldstones, sand and slag.

4. The thermal storage device of claim 2 wherein said protective layer comprises a layer of earth.

5. The thermal storage device of claim 4 wherein said protective layer further comprises an impermeable liner that prevents surface water and rainwater from entering said pool.

6. The thermal storage device of claim 5 wherein said protective layer further comprises a layer of thermal insulation.

7. The thermal storage device of claim 1 wherein said protective layer comprises a layer of thermal insulation that floats on said pool of aqueous liquid and a cover over the top of said layer of insulation that blocks transmission of solar radiation.

8. The thermal storage device of claim 1 wherein an angle of said sidewalls with respect to horizontal is less than the angle of repose for said earthen material that comprises said sidewalls.

9. The thermal storage device of claim 1 wherein said means for moving liquid comprises a warm-liquid flow path with an opening near the top of said pool and a cooled-liquid flow path with an opening near the bottom of said pool and means for reversibly moving liquid through said cooled-liquid flow path and said warm-liquid flow path.

10. The thermal storage device of claim 9 wherein said means for reversibly moving liquid comprises a cooler loop and a heat exchanger loop, said cooler loop comprises a first pump that draws liquid from said warm-liquid flow path and moves it through said cooler to produce cooled liquid and then through said cooled-liquid flow path, and said heat-exchanger loop comprises a second pump that draws liquid from said cooled-liquid flow path through said cooling load and then through said warm-liquid flow path.

11. The thermal storage device of claim 10 further comprising a controller that operates said first pump and said cooler during periods of reduced cooling load requirements to store cooled liquid in the pool of liquid and operates said second pump to move cooled liquid from the pool of liquid to said cooling load during periods of higher cooling load requirements.

12. The thermal storage device of claim 1 wherein the temperature of said liquid is below about 70° F.

13. The thermal storage device of claim 1 wherein the charge and discharge cycle time for the device is less than about one week.

14. The thermal storage device of claim 13 wherein the charge and discharge cycle time for the device is about one day.

15. A thermal storage device comprising:
a. a bed of porous fill material that substantially fills a cavity in the earth's surface,
b. a pool of aqueous liquid that fills voids within said bed of fill material,
c. a liner that is substantially impermeable to liquid and which covers the bottom of said cavity so as to contain said pool of aqueous liquid in said bed of porous fill material,
d. sidewalls of said cavity that comprise an earthen material and whose structural reinforcement is capable of being provided essentially from the porous fill material within said line;
e. a protective layer over the top of said pool of aqueous liquid that prevents transmission of solar radiation into said pool of aqueous liquid End reduces heat transfer between the pool and the environment, and
f. means for reversibly moving warm and cool liquid vertically through said pool such that when said means for reversibly moving warm and cool liquid supplies cooled liquid near the bottom of said pool and withdraws warm liquid near the top of said pool, cool liquid displaces warm liquid upward through the pool, and when said means for reversibly moving warm and cool liquid withdraws cool liquid near the bottom of said pool and supplies warm liquid near the top of said pool, warm liquid displaces cooled liquid downward through the pool.

16. The thermal storage device of claim 15 wherein said protective layer comprises a layer of earthen material.

17. The thermal storage device of claim 16 wherein said protective layer further comprises a layer of thermal insulation between said layer of earthen material and said bed of porous material.

18. The thermal storage device of claim 17 wherein said protective layer further comprises a layer that is impermeable to liquid so as to prevent flow of surface water or rain water into said pool.

19. The thermal storage device of claim 18 wherein said porous fill material is selected from the group consisting of gravel, crushed stone, fieldstones, sand, and slag.

20. The thermal storage device of claim 19 wherein said liner comprises a flexible plastic material.

* * * * *